(12) United States Patent
Cook (10) Patent No.: US 6,215,903 B1
(45) Date of Patent: Apr. 10, 2001

(54) COMPRESSION METHOD AND APPARATUS

(75) Inventor: Michael J. Cook, Sussex, WI (US)

(73) Assignee: General Electric Company, Waukesha, WI (US)

( * ) Notice: Subject to any disclaimer, the term of this patent is extended or adjusted under 35 U.S.C. 154(b) by 0 days.

(21) Appl. No.: 09/224,015

(22) Filed: Dec. 31, 1998

(51) Int. Cl.[7] ...................................................... G06K 9/36
(52) U.S. Cl. ........................................... 382/232; 382/233
(58) Field of Search ..................................... 382/232, 237, 382/233; 345/202; 348/384.1, 440.1; 358/426; 375/122; 708/203

(56) References Cited

U.S. PATENT DOCUMENTS 4,334,246 * 6/1982 Saran .................................... 358/261
5,734,753 * 3/1998 Bunce .................................. 382/237

FOREIGN PATENT DOCUMENTS

0320066 * 6/1989 (EP) .............................. G08C/19/28
03276329 * 6/1989 (JP) ................................. G06F/3/12

* cited by examiner

Primary Examiner—Jose L. Couso
Assistant Examiner—Anh Hong Do
(74) Attorney, Agent, or Firm—Quarles & Brady, LLP; Christan G. Cabou (57) ABSTRACT

A method and apparatus for compressing an initial imaging data stream, the method dividing the data stream into acquired data nibbles, comparing the acquired nibbles to initial nibble values and where an acquired nibble value and an associated initial nibble value are equal, discarding the acquired nibble and indicating so in a bit map and where the acquired nibble value and the initial value are different, placing the acquired value in an intermediate data stream and indicating retention in the bit map.

24 Claims, 6 Drawing Sheets

| COUNTER | COUNTER VALUE HEXIDECIMAL | "NIBBLE MATCH" BIT MAP | PROCESSING ORDER |
|---|---|---|---|
| c1 | 001F | 1100 | 206 c1 n4  n3  n2  n1 |
| c2 | 0039 | 1100 | |
| c3 | 00E4 | 1100 | |
| c4 | 00E6 | 1100 | |
| c5 | 10E6 | 0100 | |
| c6 | 00E0 | 1101 | |
| c7 | 01E0 | 1001 | |
| c8 | 01A0 | 1001 | |
| c9 | 0106 | 1010 | |
| c10 | 0006 | 1110 | |
| c11 | 000D | 1110 | |
| c12 | 000A | 1110 | |
| c13 | 0007 | 1110 | |
| c14 | 004C | 1100 | |
| c15 | 0194 | 1000 | |
| c16 | 01BB | 1000 | |
| c17 | 0088 | 1100 | |
| c18 | 0033 | 1100 | |
| c19 | 003F | 1100 | |
| c20 | 000A | 1110 | |
| c21 | 0-36 | 1100 | |
| c22 | 0139 | 1000 | |
| c23 | 0234 | 1000 | |
| c24 | 01EC | 1000 | c24 n4  n3  n2  n1 |

| Bit Map Encoded (hex) | Binary | Bit Map Segment | Run Length Encoded |
|---|---|---|---|
| 84 | 1000 0100 | 1111 | Yes |
| 7F | 0111 1111 | 01111111 | No |
| 92 | 1001 0010 | 111111111111111 | Yes |
| 1F | 0001 1111 | 00011111 | No |
| 3E | 0011 1110 | 00111110 | No |
| 00 | 0000 0000 | 00000000 | No |
| 3E | 0011 1110 | 00111110 | No |
| 04 | 0000 0100 | 00000100 | No |
| 01 | 0000 0001 | 00000001 | No |
| 82 | 100 0010 | 11 | Yes |
| 00 | 0000 0000 | 00000000 | No |
| 00 | 0000 0000 | 00000000 | No |
| 81 | 1000 0001 | 1 | Yes |
| 00 | 0000 0000 | 00000000 | No |

COMPRESSION METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to medical imaging and more particularly to a method and an apparatus for compressing imaging data to expedite data transfer, storage and retrieval and minimize required storage space.

As an initial matter, while the present compression method and apparatus could be used with any of several different imaging modalities (e.g. PET, CT, etc.), in order to simplify this explanation the invention will be described in the context of a PET system. However, the invention should not be so limited.

Positrons are positively charged electrons which are emitted by radio nuclides that have been prepared using a cyclotron or other device. The radio nuclides most often employed in diagnostic imaging are fluorine-18 ($^{18}F$), carbon-11 ($^{11}C$), nitrogen-13 ($^{13}N$), and oxygen-15 ($^{15}O$). Radio nuclides are employed as radioactive tracers called "radiopharmaceuticals" by incorporating them into substances such as glucose or carbon dioxide. One common use for radiopharmaceuticals is in the medical imaging field.

To use a radiopharmaceutical in imaging, the radiopharmaceutical is injected into a patient and accumulates in an organ, vessel or the like, which is to be imaged. It is known that specific radiopharmaceuticals become concentrated within certain organs or, in the case of a vessel, that specific radiopharmaceuticals will not be absorbed by a vessel wall. The process of concentrating often involves processes such as glucose metabolism, fatty acid metabolism and protein synthesis. Hereinafter, in the interest of simplifying this explanation, an organ to be imaged will be referred to generally as an "organ of interest" and prior art and the invention will be described with respect to a hypothetical organ of interest.

After the radiopharmaceutical becomes concentrated within an organ of interest and while the radio nuclides decay, the radio nuclides emit positrons. The positrons travel a very short distance before they encounter an electron and, when the positron encounters an electron, the positron is annihilated and converted into two photons, or gamma rays. This annihilation event is characterized by two features which are pertinent to medical imaging and particularly to medical imaging using photon emission tomography (PET). First, each gamma ray has an energy of essentially 511 keV upon annihilation. Second, the two gamma rays are directed in substantially opposite directions.

In PET imaging, if the general locations of annihilations can be identified in three dimensions, a three dimensional image of an organ of interest can be reconstructed for observation. To detect annihilation locations, a PET camera is employed. An exemplary PET camera includes a plurality of detector units and a processor which, among other things, includes coincidence detection circuitry. An exemplary detector unit includes a 6×6 matrix of bismuth germinate (BGO) scintillator crystals which are disposed in front of four photo multiplier tubes (PMTs). When a crystal absorbs a photon, the crystal generates light which is generally directed toward the PMTs. The PMTs absorb the light and each PMT produces an analog signal which arises sharply when a scintillation event occurs and then tails off exponentially with a time constant of approximately 300 nanoseconds. The relative magnitudes of the analog PMT signals are determined by the position in the 6×6 BGO matrix of the crystal which generates the light (i.e. where the scintillation event takes place), and the total magnitude of these signals is determined by the energy of the photon which caused an event.

A set of acquisition circuits receives the PMT signals and determines x and y event coordinates within the BGO matrix thereby determining the crystal which absorbed the photon. Each acquisition circuit also produces an event detection pulse (EDP) which indicates the exact moment at which a scintillation event took place.

The information regarding each valid event is assembled into a digital event data packet which indicates precisely when the event took place and the position of the BGO crystal which detected the event. Event data packets are conveyed to a coincidence detector which determines if any two events are in coincidence. Coincidence is determined by a number of factors. First, the time markers in each event data packet must be within a specific time window of each other, and second, the locations indicated by the two event data packets must lie on a straight line which passes through the field of view of a scanner imaging area. Events which cannot be paired as coincidence events are discarded, but coincidence event pairs are located and recorded as a coincidence data packets (CDPs). Each coincidence data packet includes a pair of digital numbers which precisely identify the addresses of the two BGO crystals that detected the event.

To compress annihilation data somewhat, instead of separately storing an indication of each CDP, a typical PET processor simply stores a separate counter for each possible "meaningful" detector pair. What is meant by the term "meaningful" is that there are certain theoretically possible detector pairs which will almost certainly never provide a true annihilation indication. For example, because an annihilation typically sends gamma rays in opposite directions and annihilation points are within an imaging area, it is essentially impossible for two adjacent detectors to provide a true annihilation indication. Similarly, other detectors which are disposed in the same general area as a first detector cannot provide a true annihilation indication along with the first detector. Thus, proximate detectors are not meaningful pairs and the processor does not provide a counter for these pairs.

In addition, the number of meaningful detector pairs is also limited by the fact that certain detector pairs are positioned such that the organ of interest, and any radiopharmaceutical accumulated therein, is not within the space there between. In this case, once again, the detector pair cannot provide a true annihilation indication. Thus, while theoretically it is possible to have approximately 144 million detector pairs where there are 12,000 crystals, instead of providing 144 million counters and memory required to store 144 million annihilation counts, the meaningful number of detector pairs and hence processor counters, is reduced to approximately 25 million.

After an acquisition period coincidence counts are transferred to secondary memory storage devices during an archiving process. Thereafter the system can be used to acquire data corresponding to another image. The archived data is then used by image construction software which employs any of several different back projection techniques which are well known in the industry to generate a three dimensional image of the organ of interest which is viewable via an electronic display. While PET systems as described above facilitate high quality image generation, the amount of data required to generate a PET image leads to some practical problems which increase system costs and reduce system efficiency. First, a typical PET counter is 16 bit so that large numbers of coincidence events can be detected and tallied. This means that, even where the number of counters is minimized by selecting only meaningful coincidence pairs, the amount of raw data produced during a single three-dimensional scanning period is approximately 500 Megabytes. To store 500 Megabytes of data during an acquisition period large on line and dedicated storage devices are required.

Because such massive on line memory is required for each PET image generated, most on line memory systems cannot accommodate more than a single set of PET image data at one time. Therefore, in between PET acquisition periods PET data has to be archived on the secondary memory devices. Data acquisition cannot be performed during archiving and therefore archiving reduces PET system efficiency.

This archiving problem is exacerbated by the fact that archiving is an extremely time consuming process. To reduce overall costs secondary data storage devices used to store PET data are typically configured using inexpensive hardware which can only receive data at relatively slow speeds. For example, an exemplary secondary storage device uses Advance DAT tape as the storage medium which can only receive data at approximately 150 Kb per second. Thus, the archiving process to archive 500 Megabytes of data takes a long time. 20 Second, just as massive on line memory is required to acquire PET data, massive secondary memory is also required which increases system costs.

Third, just as typical secondary memory is only capable of receiving data at a relatively slow speed, during subsequent data retrieval, data can only be accessed at a slow speed (e.g. 150 kb/sec) due to hardware constraints.

One way to reduce the amount of secondary memory required to support a PET system is to use PET data only once to generate a PET image data set via back projection techniques and then store the image data set, discarding the raw PET data.

Unfortunately, in most cases it is advantageous to save PET raw data. This is because the PET industry is constantly developing new and improved back projection techniques which result in better PET images from raw PET data. Where raw data is discarded new raw data has to be generated to provide an image, this process being time consuming and expensive.

Another solution to speed up data transfer to secondary memory, speed up data retrieval from secondary memory and reduce the size of the secondary memory required to store PET data is to compress PET data into a reduced data set. Many different data compression schemes have been used to compress raw data. An exemplary and well known data compression scheme which has been used in the PET imaging area is referred to as the Lempel-Ziv (LZ) compression algorithm. The LZ algorithm successfully reduces raw data size and can be used to subsequently expand compressed data.

Unfortunately, the LZ algorithm was developed as a general data compression scheme for use in many different industries. Because of its many different uses the LZ algorithm accounts for many different factors and therefore is computationally extremely intensive. Thus, to implement the LZ algorithm using a PET scanner a relatively large amount of time is required to compress and/or expand raw data. While the LZ and other similar compression schemes reduce the overall time required for data transfer from a PET system and data retrieval from a secondary storage device, the time required for such transactions is still appreciable. In this regard, the LZ method is exemplary of other compression schemes which require excessive time to compress data.

SUMMARY OF THE INVENTION

An exemplary embodiment of the invention includes a method for compressing imaging data which comprises the steps of dividing raw acquired imaging data counter counts into separate acquired data nibbles, rearranging the nibbles by nibble significance (i.e. most significant nibbles in consecutive counters are sequentially listed followed by a sequential listing of second most significant nibbles in consecutive counters and so on to the least significant nibbles), comparing each rearranged nibble to an initial associated nibble value and, where an acquired nibble is different than the initial nibble value, adding the acquired nibble to an intermediate data stream and indicating the addition in a bit map and, where an acquired nibble is equal to the initial nibble value, indicating equality of the nibble in the bit map without adding the acquired nibble to the intermediate data stream. The bit map is run length encoded to further compress the data. Similarly, preferably, the intermediate data stream is run length encoded to further compress the data. Thereafter, the bit map is appended to the compressed intermediate data stream to form a complete compressed data stream which is transferred to secondary memory for storage or subsequent processing.

It has been recognized that imaging data often has a relatively simple and unique form which can be exploited when compressing. To this end, while imaging counts can be extremely large under certain circumstances, imaging counts generated by coincidence crystal pairs are often relatively small values at the end of an acquisition period. Thus, while each counter must be able to accommodate a large count and therefore often comprises a 16 bit counter, during acquisition only very few counters ever actually use all 16 bits to indicate detected annihilation events. In fact, many counters only use the least significant four or eight bits of their 16 bits to tally meaningful counts, the most significant bits remaining equal to their initial values.

Recognizing that many bits in most counters never change during an acquisition, the present invention eliminates many of the unchanged bits from the data stream. To this end, the inventive method divides each counter word into a plurality of nibbles and effectively removed nibbles from the data stream which are unchanged during an acquisition thereby reducing the size of the data stream appreciably. The bit map indicates which nibbles have been deleted and which have not been deleted and therefore can be used during expansion of the compressed data to generate the initial uncompressed data stream.

In addition, by rearranging the data so that relatively more significant counter nibbles are followed consecutively by less significant counter nibbles, a much more effective bit map compression results. This is because the unchanged nibble streams after rearrangement will, in most cases, be much longer than prior to rearrangement.

After compressing the data stream in this manner the bit map is further compressed using a run length encoding scheme, one of which is described in more detail below, and a header nibble for checking data compression and expansion accuracy is added to the compressed stream.

DESCRIPTION OF THE PREFERRED EMBODIMENT

I. HARDWARE

Referring now to the drawings, wherein like reference characters and symbols represent corresponding elements and signals throughout the several views, and more specifically referring to FIG. 1, the present invention will be described in the context of an exemplary PET scanner system 8. System 8 includes an acquisition system 10, an operator work station 15, a data acquisition processor 30 and an image reconstruction processor 40.

System 10 includes a gantry 9 which supports a detector ring assembly 11 about a central bore which defines an imaging area 12. A patient table (not illustrated) is positioned in front of gantry 9 and is aligned with imaging area 12. A patient table controller (not shown) moves a table bed into imaging area 12 in response to commands received from work station 15 through a serial communications link 18.

A gantry controller 17 is mounted within gantry 9 and is responsive to commands received from operator work station 15 through link 18 to operate gantry 9. For example, gantry 9 can be tilted away from vertical on command from an operator, can perform a "transmission scan" with a calibrated radio nuclide source to acquire attenuation measurements, can perform a "coincidence timing calibration scan" to acquire corrective data, or can perform a normal "emission scan" in which positron annihilation events are counted.

Figure 1:
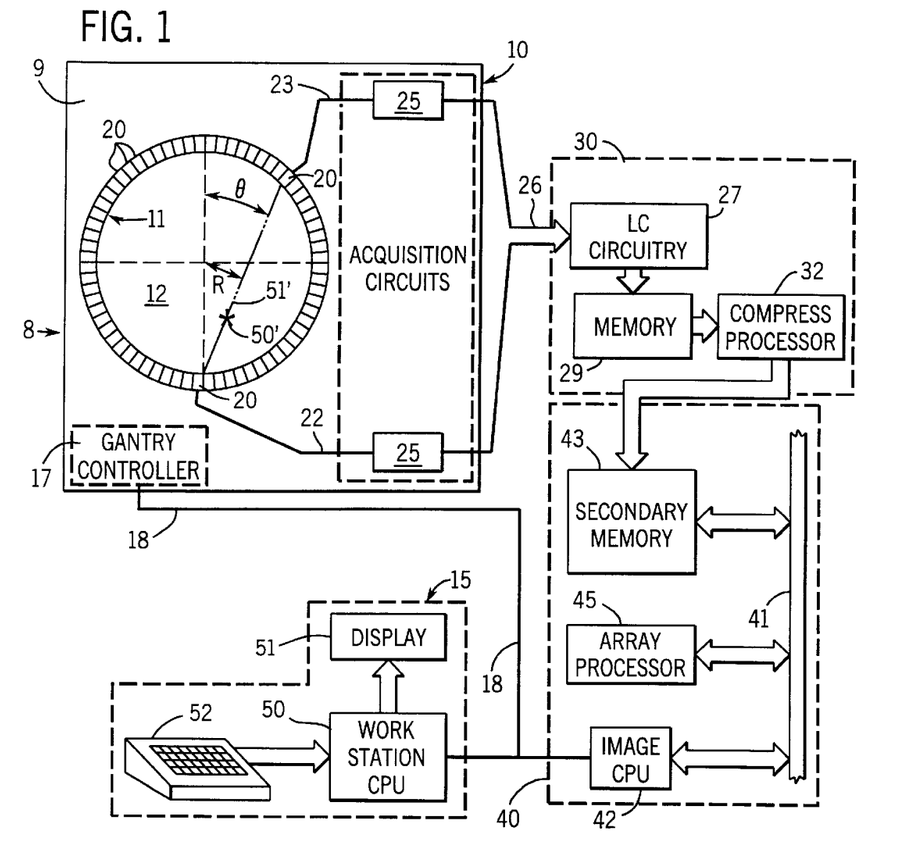
FIG. 1 is a schematic view of a PET scanner system including a processor for carrying out the inventive method.
Figure 2:
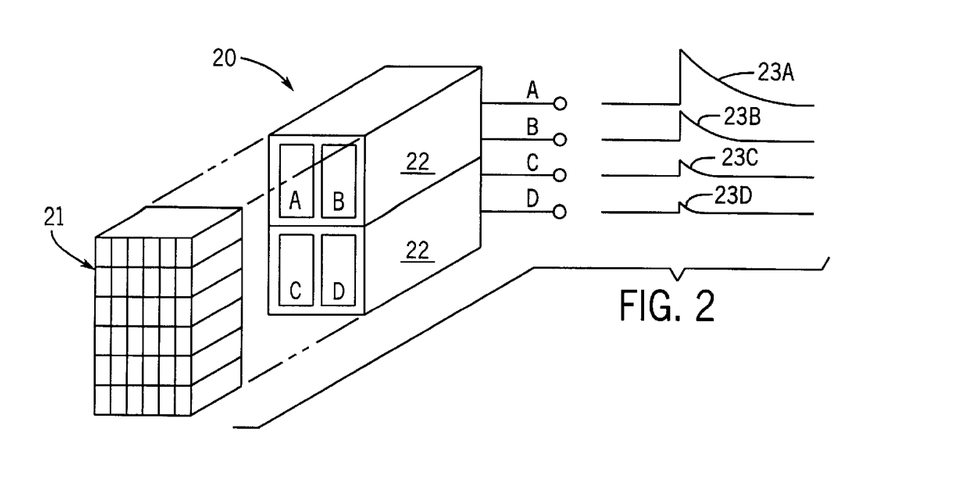
FIG. 2 is a perspective view of a detector unit of FIG. 1.

Referring to FIGS. 1 and 2, detector 11 is comprised of a large number of detector units 20. Each units 20 includes a set of bismuth germinate (BGO) scintillator crystals 21 arranged in a 6×6 matrix and disposed in front of four photo multiplier tubes (PMTs) 22. When a crystal 21 absorbs a photon the crystal 21 emits light which is directed at PMTs 22. PMTs 22 detect the light and each PMT 22 produces an analog signal 23A–23D which arises sharply when a scintillation event occurs and then tails off exponentially with a time constant of approximately 300 nanoseconds. The relative magnitudes of the analog signals 23A–23D is determined by the position in the 6×6 BGO matrix at which a scintillation event takes place, and the total magnitude of these signals is determined by the energy of the photon which caused the event.

A set of acquisition circuits 25 are mounted within gantry 9 to receive the four signals 23A–23D from each unit 20 in detector ring 11. Acquisition circuits 25 determined x and y event coordinates within the block of BGO crystals 21 by comparing the relative signal strengths as follows:

$$x = (A+C)/(A+B+C+D) \quad (1)$$

$$z = (A+B)/(A+B+C+D) \quad (2)$$

These coordinates (x,z), along with the sum of all four signals (A+B+C+D) are then digitized and sent through a cable 26 to processor 30. Each acquisition circuit 25 also produces an event detection pulse (EDP) which indicates the exact moment at which a scintillation event took place.

Processor 30 includes locator and coincidence LC circuitry 27, an on line memory 29 and a processor 32 for performing data compression. LC circuitry 27 is comprised of set of separate circuit boards which each connect to cable 26 and receive signals from corresponding acquisition circuits 25. Circuitry 27 performs four tasks. First, circuitry 27 synchronizes an event with operation of processor 30 by detecting the event pulse (EDP) produced by an acquisition circuit 25, and converting the event pulse into a digital time marker which indicates when within a current sample period an associated scintillation event took place. Second, circuitry 27 discards any detected events if the total energy of the scintillation is outside a photon range which is typically 511 keV±20%.

Third, LC circuitry 27 compares the EDPs and determines if any two EDPs are in coincidence. Coincidence is determined by a number of factors. First, EDPs in each event data packet must be within a small window of time of each other, and second, the locations indicated by the two event data packets must lie on a straight line which passes through the field of view (FOV) in imaging area 12. Events which cannot be paired as coincidence events are discarded, but coincidence event pairs are located and recorded as a coincidence data packet (CDP). Each CDP includes a pair of digital numbers which precisely identify the addresses of the two BGO crystals 21 that detected the event.

Fourth, circuitry 27 generates memory addresses for the CDPs to efficiently store coincidence counts. Referring still to FIG. 1, the set of all projection rays that point in the same direction (θ) and pass through the scanner's field of view is a complete projection, or "view". A distance R between a particular projection ray and a center of the field of view locates that projection ray within the field of view. As shown in FIG. 1, for example, a positron annihilation (hereinafter an "event") 50' occurs along a projection ray 51' which is located in a view at the projection angle θ and the distance R. Circuitry 27 counts all of the events which occur on this projection ray (R, θ) during an acquisition period by sorting out the coincidence data packets that indicate an event at the two BGO crystals lying on ray 51'.

During a data acquisition, the coincidence counts are organized in memory 29 as a set of two-dimensional arrays, one for each axial image, and each having as one of its dimensions the projection angle θ and the other dimension the distance R. This θ by R map of detected events is called a histogram.

CDPs occur at random and circuitry 27 quickly determines the θ and R values from the two crystal addresses in each CDP and increments the count of the corresponding histogram array element. The values of θ and R may be calculated as follows, although in the preferred embodiment these are converted to memory addresses:

$$\theta = (\phi_2 + \phi_1)/2 + 90° \quad (3)$$

$$R = r_0 \cos[(\phi_2 - \phi_1)/2] \quad (4)$$

where $\phi_1$=angular orientation of the first detector crystal;

$\phi_2$=angular orientation of the second detector crystal; and $r_0$=radius of detector ring.

At the completion of an acquisition period the total number of annihilation events which occurred along each ray (R, θ) are stored in the sinogram in on line memory 29. As in the background section above, hereinafter it will be assumed that the system described above is capable of distinguishing between 25 million different "meaningful" detector pairs (i.e. different rays (R, θ)) and that each counter includes a 16 bit binary number and therefore, for every separate high resolution data acquisition which is performed, an approximately 500 Mb block of memory space has to be set aside.

After data acquisition the uncompressed data stream in memory 29 is provided to processor 32 which compresses the data in the inventive manner which is described in more detail below. After data compression processor 32 provides the compressed data stream to processor 40.

Processor 40 includes a secondary memory 43, an array processor 45, an image CPU 42 and a backplane bus 41. Bus 41 conforms to the VME standards. Image CPU 42 controls the backplane bus 41 and links processor 40 to local network 18. Module 43 also connects to backplane 41 and it stores the compressed data provided by processor 32 and which is subsequently used to reconstruct images as will be described in more detail below. Array processor 45 also connects to the backplane 41 and operates under the direction of image CPU 42 to perform the image reconstruction using data in memory 43. The resulting image array 46 is stored in memory 43 and is output by image CPU 42 to operator work station 15.

Station 15 includes a CPU 50, a CRT display 51 and a keyboard 52. CPU 50 connects to network 18 and it scans the key board 52 for input information. Through the keyboard 52 and associated control panel switches, an operator can control calibration of the system 9, its configuration, and positioning of the patient table during an acquisition period.

II. DATA COMPRESSION

According to the present invention PET data is compressed by, after data acquisition, dividing each acquired PET counter value into a plurality of nibbles, analyzing each nibble to determine if the nibble value changed during the acquisition, where the nibble value has not changed during the acquisition, deleting the nibble from the data stream and indicating deletion in a bit map and, where the nibble value has changed, leaving the nibble value in the data stream and indicating that the nibble value has been left unchanged in the data stream. After compression in this manner the compressed data is transferred to secondary memory 43 for subsequent retrieval.

An example of how the inventive method works is instructive. For the purpose of simplifying this explanation only a small portion of acquired data will be used in this example. In addition it will be assumed that each of the initial counter values is zero (i.e. no counts exist prior to an acquisition period).

Figure 3:
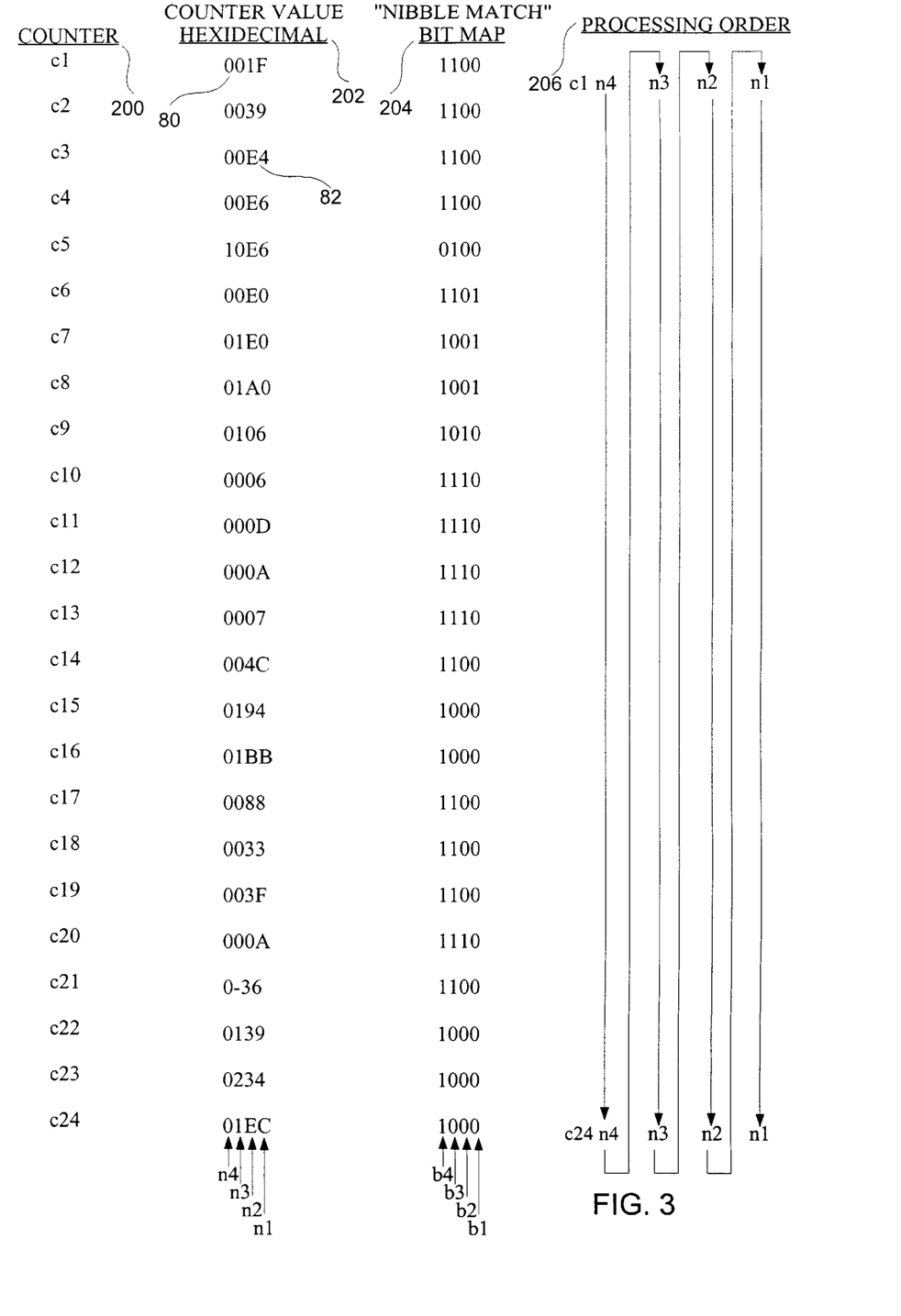
FIG. 3 is a table illustrating acquired counter data and an uncompressed data bit map.

Referring now to FIGS. 1 and 3, this example will be explained in the context of 24 counters, each of which includes an N bit hexadecimal word. In FIG. 3, the 24 counters are identified as c1 through c24 and their corresponding N bit counts are arranged in a counter value column 202 in four nibble subcolumns n1 through n4 ranging from a most significant nibble n4 through a least significant nibble n1.

Hereinafter each nibble will be referred to first by counter number and then by nibble number. For example, the most significant nibble 80 in the first counter will be referred to hereinafter as nibble c1, n4, the least significant nibble 82 in the third counter c3 will be referred to as c3, n1 and so on.

Also shown in FIG. 3 is a "nibble match" bit map or data bit map column 204 and a processing order 206. Bit map column 204, like the counter values of column 202, includes four subcolumns b1, b2, b3, and b4, each column b1 through b4 corresponding to a separate one of columns n1 through n4, respectively. Bits in column 204 are referred to hereinafter by counter number and sub-column (e. g. c1, b4, etc.)

During data acquisition, each of counters c1 through c24 is incremented each time an associated coincidence pair is identified by LC circuitry 27. At the end of an acquisition period, the counter values, referred to hereinafter as the acquisition count values, are as illustrated in FIG. 3, column 202. Thus, the first counter c1 has a total count of 31 (i.e. hexadecimal count 001 FN), the second counter c2 has a 57 total count (i.e. hexadecimal number 0039), the third counter c3 has a 228 total count (i.e. hexadecimal number 00E4), and so on.

Thus, the first two hexadecimal nibbles in counter c1 have not changed during the acquisition. Similarly, the first two nibbles in each of counters c2, c3, and c4 have not changed. Continuing, the second hexadecimal nibble in counter c5 has not changed and so. Because none of the nibble values indicated above changed during acquisition, each of the values is known and is zero.

According to the present invention, for each nibble in each of the counters c1 through c24 which has not changed during acquisition, the nibble is effectively removed from the data stream and removal is indicated in the bit map in column 204. When a nibble is removed from a data stream, removal is indicated by placing a "1" in the bit map nibble. For nibbles that have changed during acquisition, a "0" is placed in the bit map to indicate a change from the original zero value. In addition, nibbles which have changed during acquisition are placed in an intermediate data stream.

Importantly, according to the present invention, the order in which hexadecimal counter nibbles are compared to initial nibble values is not from most significant nibble in a counter to least significant nibble in the counter or viceaversa. Instead, prior to comparing the hexadecimal counter nibbles to initial values, the counter nibbles are rearranged so that the most significant nibbles in each of the counters is compared sequentially followed by the second most significant nibbles in each counter, followed by the third most significant nibbles in each counter and then followed by the least significant nibbles in each counter. This rearranging or processing order is illustrated schematically in column 206 of FIG. 3 where the most significant nibble column is first followed by the second most significant column and so on. For example, referring still to FIG. 3, the order of nibbles in the rearranged data stream would be nibble c1, n4, followed by nibbles c2, n4; nibble c3, n4; nibble c4, n4; . . . through nibble c24, n4. The data stream would continue with nibble c1, n3 followed by nibble c2, n3; c4, n3; through c24, n3.

Thereafter, the stream would continue with nibble c1, n2 through nibble c24, n2 and then would end with nibbles c1, n1 through c24, n1.

After the counter nibbles have been rearranged, the rearranged nibbles are compared consecutively to their initial values to generate both a bit map and the intermediate data stream, the data stream including a single entry for each nibble in the rearranged data stream which is different than the initial nibble value.

Figure 4:
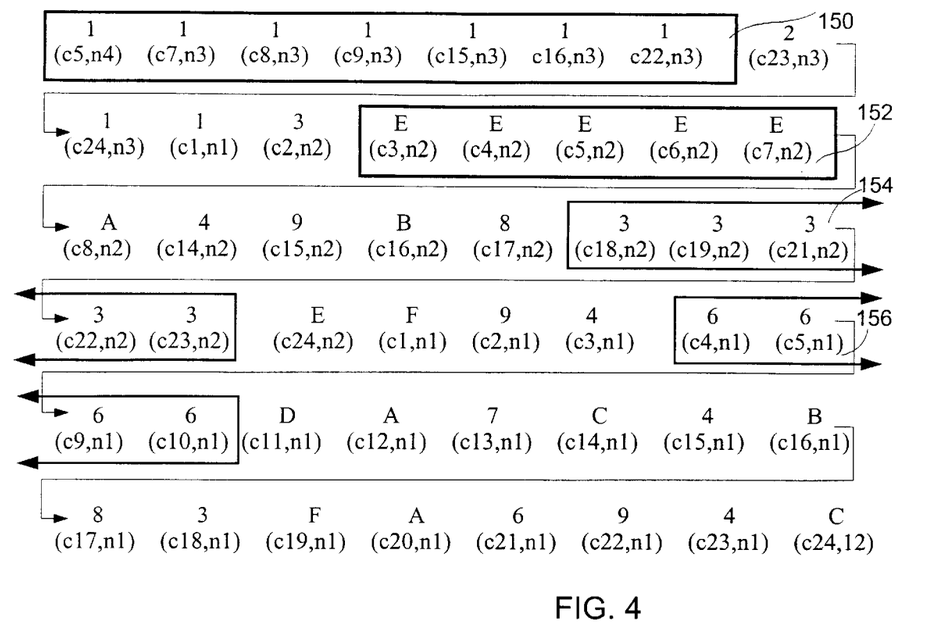
FIG. 4 is a schematic illustrating an intermediate data stream according to the present invention.

For example, referring now to FIG. 4, an exemplary intermediate data stream is illustrated which includes a single entry for each counter nibble which was changed during the data acquisition. Referring also to FIG. 3, and specifically to the first nibble c1, n4 in counter c1, because nibble c1, n4 is unchanged from its associated initial nibble value (i.e. 0), nibble c1, n4 is not placed in the intermediate data stream and that nibble is discarded. In addition, a "1" is placed in the bit map as bit c1, b4 indicating that the associated nibble has been deleted. Similarly, each of nibbles c2, n4; c3, n4; and c4, n4 remain unchanged from their associated initial nibble values (i.e. 0) and therefore none of those nibbles is included in the intermediate data stream shown in FIG. 4. In addition, ones are placed in each of the bit map bits c2, b4; c3, b4; and c4, b4, indicating that associated nibbles have been discarded.

Referring still to FIGS. 3 and 4, nibble c5, n4 has a "1" value and therefore has changed from its initial value. For this reason, the value of nibble c5, n4 is placed in the intermediate data stream illustrated in FIG. 4 as the first bit in that intermediate data stream (identified as c5, n4). In addition, referring to FIG. 3 and specifically to column 204, a 0 is placed in the bit map at bit map data stream c5, b4 indicating that the associated nibble is included in the intermediate bit map of FIG. 4.

Continuing, referring still to FIGS. 3 and 4, each of the most significant bits in counter c6 through c24 remains unchanged and therefore none of those nibble values is included in the intermediate data stream of FIG. 4 and 1s are placed in each of the most significant bit map bits corresponding to counter c6 through c24. Similarly, each of the second most significant counter nibbles (i.e. in column n3) for counter c1 through c6 remain unchanged and therefore are not included in the intermediate data stream of FIG. 4 and 1s are placed in corresponding bit map bits in column 204.

However, the second most significant bit c7, n3 in counter c7 is one indicating that that nibble has changed from its initial nibble value (i.e. 0). Therefore, the value of nibble c7, n3 is placed in the intermediate data stream in FIG. 4 as the second nibble (i.e. identified as nibble c7, n3 in FIG. 4). In addition, a 0 is placed in the bit map bit c7, b3 which corresponds to the counter nibble c7, n3. This process continues until every counter nibble c1, n4 through c24, n1 has been compared to its initial nibble value and the nibble has either been discarded because the acquired value is unchanged from the initial value or has been added to the intermediate data stream of FIG. 4 because the acquired nibble value has changed from its initial nibble value.

Next, with a bit map of column 204 formed and the intermediate data stream of FIG. 4 form, each of the bit map 204 and intermediate data stream are compressed using run length encoding schemes. To this end, run length encoding consists of replacing a string of repeated characters (bit, word, or values) with an encoded string indicating the number of "repeats" of a particular character (bit, word, or value). Four repeat strings 150, 152, 154, and 156 are identified in the intermediate data stream of FIG. 4. While the same procedure is used to run length encode each of strings 150, 152, 154, and 156, the invention will be described in the context of encoding string 150.

Figure 5:
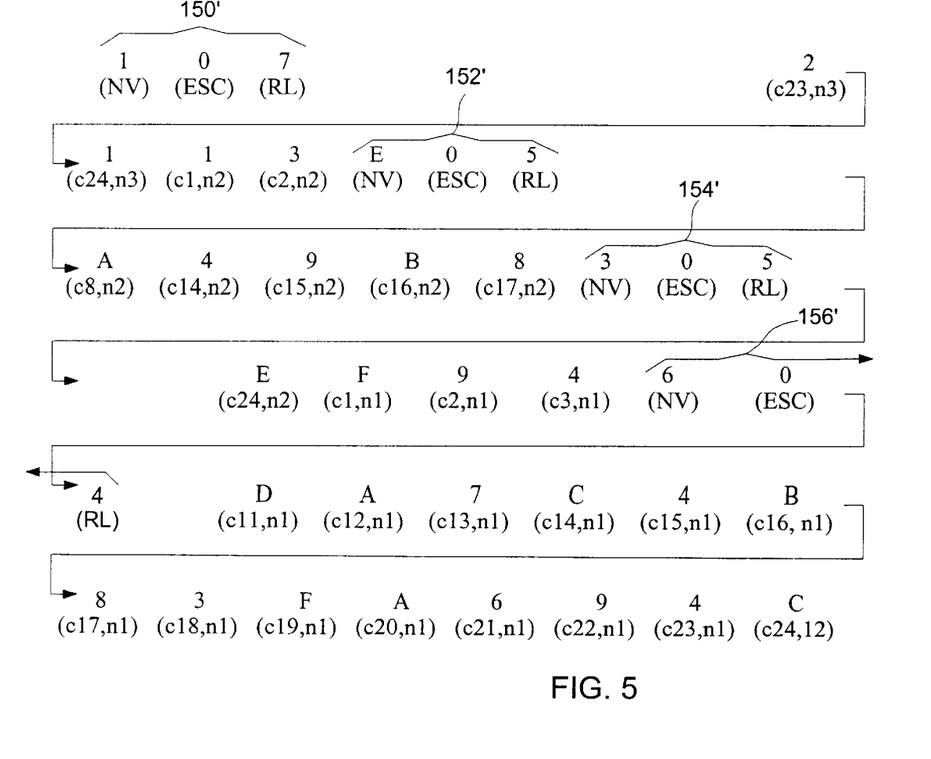
FIG. 5 is a schematic illustrating the data stream of FIG. 4, albeit in a compressed state.

Referring to FIGS. 4 and 5, the hexadecimal encoding for string 150 includes a nibble value NV, an escape character ESC and a run length character RL which are shown under corresponding values, the entire hexadecimal encoding for string 150 identified by numeral 150'. The nibble value NV indicates the common value of the string of nibbles. In the present example, the nibble value NV is 1. The escape character ESC in the present example is chosen to be 0 (i.e. the initial value nibble character) since, by design, the initial value nibble will never appear in the intermediate data stream. The run length character RL in the present example is seven indicating that string 150 includes seven consecutive 1 nibble values.

Similarly encoding is illustrated in FIG. 5 for each of strings 152, 154, and 156 of FIG. 4, the corresponding encoding identified by numerals 152', 154', and 156', respectively.

It is contemplated that in many cases the run length of consecutive identical nibbles in the intermediate data stream will be much greater than 16 and therefore that a single run length RL character will not be sufficient for specifying a string run length. In this case, it is contemplated that instead of including a single escape character ESC, two or perhaps three escape characters may be provided which would be recognized as indicating a repeat string including more than 16 nibbles. Operation of such a scheme is known in the art and therefore will not be explained here in detail.

Referring still to FIG. 3, to encode bit map 204, a slightly different run length encoding scheme is contemplated. To this end, two hexadecimal characters (i.e. 1 byte) are used for run length encoding. The most significant bit of the first character is set equal to "1" to indicate a run of 1's. The second most significant bit is set equal to "0" to indicate one byte for run length encoding. The six least significant bits in the two bytes equal the run length. For example, ten consecutive 1's would be represented in hexadecimal encoding as 8A, whereas 27 consecutive 1's would be represented in hexadecimal encoding as 99.

As above with respect to run length encoding the intermediate data stream, it is contemplated that in many instances the length of a consecutive repeat string in the bit map will far exceed the number represented by a six bit hexadecimal code. In this case, it is contemplated that four characters (i.e. 2 bytes) will be used for run length encoding. In this case, the most significant bit will again equal "1" to indicate a run of "1's." The second most significant bit will equal "1" to indicate two bytes for run length encoding. The 14 least significant bits of the two bytes indicate the run length. For example, 100 consecutive 1's would be represented in hexadecimal encoding as E064 whereas 270 would be represented as c10E.

Figure 6:
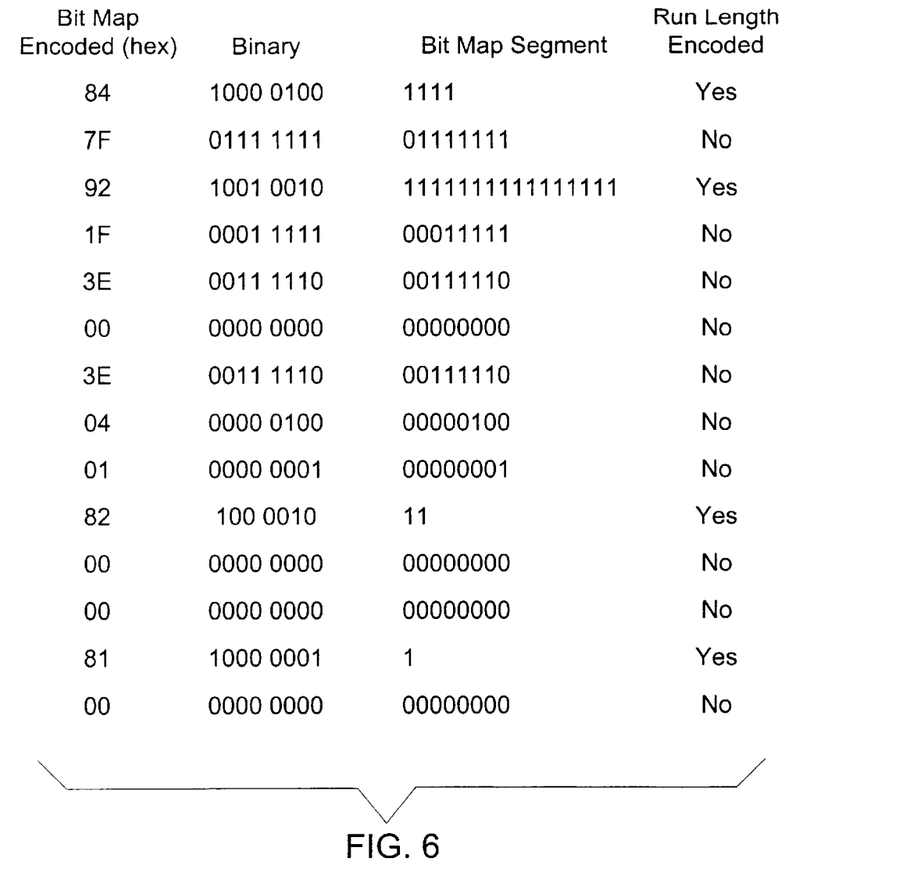
FIG. 6 is a table illustrating bit map compression according to the present invention.

It is important to note that processing order of the bit map follows the same processing order as the hexadecimal counter values in column 202 of FIG. 3, the order indicated in column 206 of FIG. 3. For example, referring to column 204, bit map bits are searched from bit c1, b4 through bit c24, b4, bit c1, b3 through bit c24, b3, bit c1, b2 through bit c24, b2 and bit c1, b1 through bit c24, b1. This reordering yields a high probability of consecutive "matches" and the bit map binary stream is ordered as such when stored. The results from the exemplary bit map run length encoding are illustrated in FIG. 6.

Next, for every compressed data segment a header consisting of 4 to 6 bytes is generated. The header is required for decompression of the segment. The first 4 bytes are referred to as a "leading word." The leading word is immediately followed by a 2-byte "segment size" if, and only if, the uncompressed segment size was less than the standard segment size of 2 KB. The segment size indicates the size of the original compressed segment in short words (a short word is equal to 2 bytes).

Figure 7:
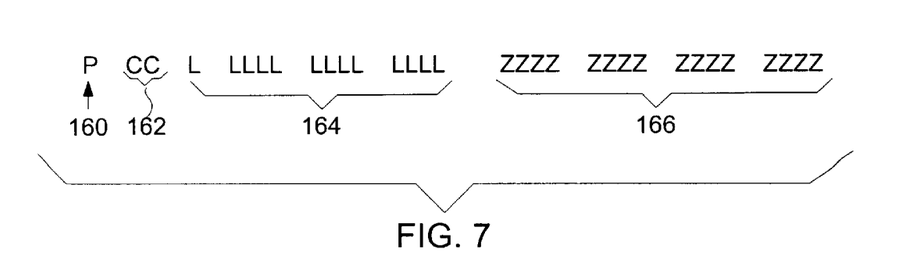
FIG. 7 is a schematic illustrating the separate components of a leading word according to present invention.

The leading word includes four separate sections including 4 bytes which are illustrated in FIG. 7. The first bit 160 of the first byte indicates whether or not the following segment is standard or nonstandard in size. In this regard, it is contemplated that a zero would imply a partial or nonstandard size segment whereas a 1 would imply a standard size segment (i.e. 2 KB). The next two bits 162 in the first byte are a map code wherein 00 implies that a segment is not compressed, 01 implies that a segment has a noncompressed bit map, 10 implies an undefined following segment (i.e. a segment to be defined in the future), and 11 implies a compressed bit map. The last bit in the first leading word byte and the next 12 bits 164 in the leading word indicate an intermediate data stream nibbles segment size. The remaining 16 bits (i.e. last 2 bytes) 166 in the leading word indicate a compressed segment size in bytes. For the example data, the header would consist of a leading word equal to 60140028 (hex), the 6 (i.e. 0110) indicating a nonstandard size segment and that the segment includes a compressed bit map, the 014 (hex) (00010100) indicating that the nonmatch nibble segment size includes 20 bytes, and the 0028 (hex) (00101 000) indicating that the compressed segment size in bytes includes 40 bytes. In the present example, because the uncompressed segment is less than the standard segment size, the leading word is followed by a segment size of 0030 (hex).

Figure 8:
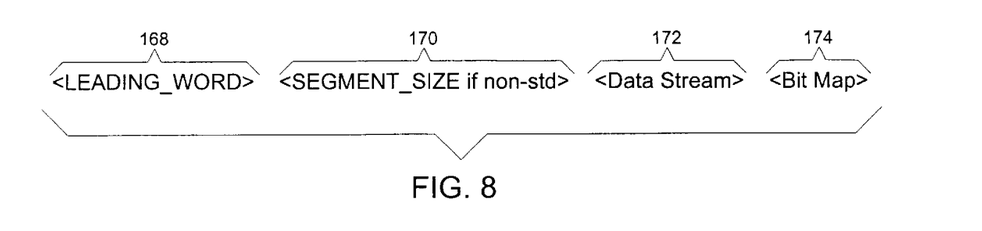
FIG. 8 is a schematic illustrating a compressed segment according to the present invention.

Referring now to FIG. 8, an exemplary order for a compressed segment according to the present invention is illustrated and includes four fields. The first field 168 includes the leading word illustrated in FIG. 7. The second field 170 includes a segment size and is included if and only if the first bit in the leading word indicates a nonstandard size (i.e. the first bit is a zero). The third field 172 includes the run length encoded intermediate data stream while the fourth field 174 includes the run length encoded bit map.

Figure 9:
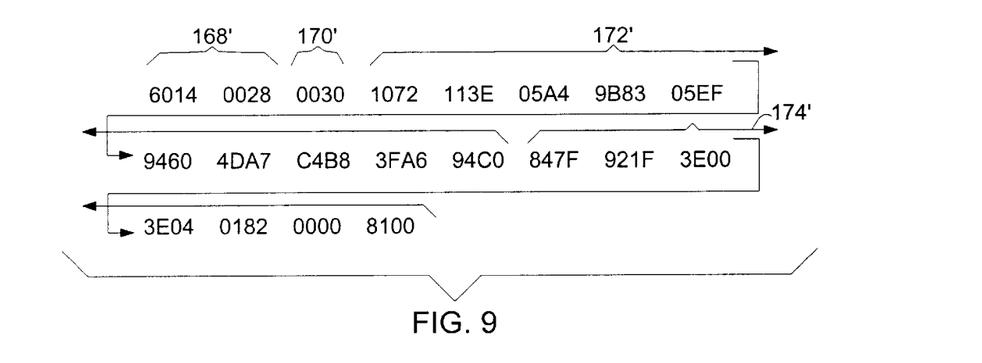
FIG. 9 is exemplary data corresponding to FIG. 8.

Referring also to FIG. 9, the data segment which results from compression of the exemplary data using the present invention is illustrated. The leading word field is identified by 168', the segment size field is identified by 170', the run length encoded intermediate data stream field is identified by 172' and the encoded bit map field is identified by 174'. The compressed segment for the example data includes 40 bytes compared to 48 bytes for the uncompressed segment for a total reduction of approximately 16.6% in segment size. The low compression (i.e. 16.6%) is due to the relatively small data segment size and uncharacteristic distribution of counts. It should be appreciated that if a larger data set was used and more characteristic count distributions were considered, compression would be much greater.

Figure 10:
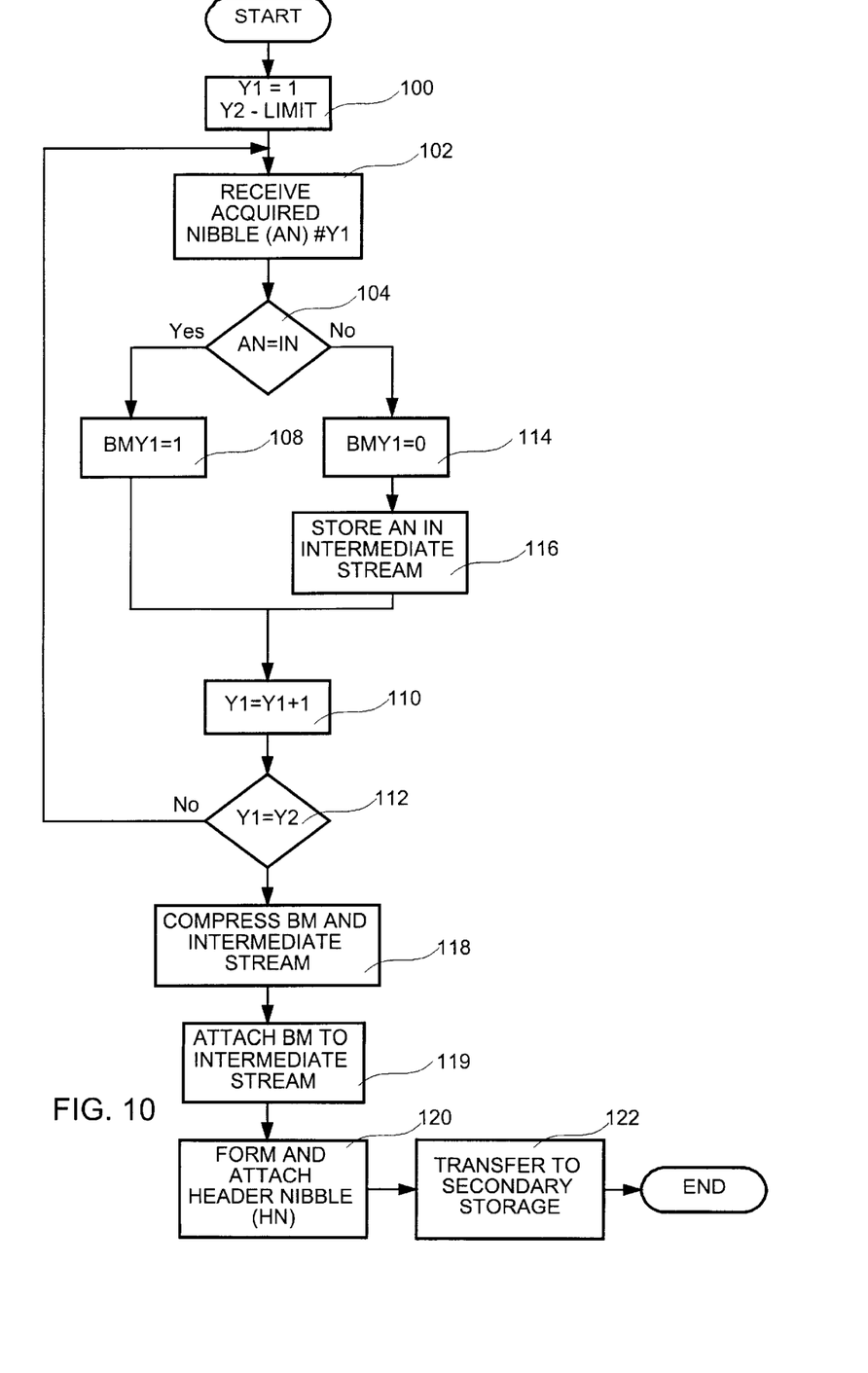
FIG. 10 is a flow chart illustrating the inventive method.

Referring now to FIG. 10, the inventive method and the example above will be described again with reference to the flow chart illustrated. Referring also to FIGS. 1 and 3, at block 100 a nibble counter Y1 is set and a nibble limit Y2 is set. Limit Y2 is the total number of nibbles in all of the system counters plus one. In the present example, because there are four nibbles per counter, Y2 would be one plus four times the total number of counters. In this simplified example, because there are only 24 counters, Y2 is initially set to 97 (i.e. one plus (4 nibbles ×24 counters)). Y1 is set to 1 at block 100. As indicated above, during processing, the counter nibbles are considered in the order indicated in column 206 of FIG. 3.

At block 102 processor 32 receives acquired nibble number Y1 (i.e. the first nibble in the data stream). Hereinafter the acquired nibble will be referred to as AN. Referring to FIG. 3, as indicated above nibble number 1 is nibble c1, n4 and therefore processor receives acquired nibble AN which has the value "0". At decision block 104 processor 32 compares the AN to the initial nibble IN. The initial nibble IN is always "0" in this example. Therefore, the AN and the IN are identical and control passes to block 108 where a bit c1, b4 in the bit map BM is set equal to "1" indicating that an associated nibble (i.e. c1, n4) has not been placed in the intermediate data stream.

Referring still to FIG. 10, at block 110 counter Y1 is incremented by one and at block 112 counter Y1 is compared to limit Y2. At this point counter Y1 is 2 and therefore control passes back up to process block 102.

At block 102 processor 32 receives acquired nibble Y1 where Y1 is equal to 2. Thus, controller 32 receives nibble c2, n4 or "0" once again. The processor steps through blocks 104, 108 again and at block 110 counter Y1 is incremented to a value of 3. This cyclic process continues until counter Y1 is equal to 5 and therefore the fifth nibble c5, n4 (i.e. "1") is received by processor 32 at block 102 (see FIGS. 1, 3 and 6).

At block 104 the fifth acquired nibble AN is compared to the initial nibble IN. Because the AN and the IN are not equal control passed to block 114 where bit c5, n4 (i.e. the fifth bit map bit) is set equal to "0" indicating that the fifth acquired nibble is going to be placed in the intermediate data stream. At block 116 the fifth acquired nibble (i.e. "1") is placed in the next nibble in an intermediate data stream. Thereafter control passes to block 110 where counter Y1 is again incremented by one.

This cyclic process continues with acquired nibbles that equal initial nibbles being discarded and acquired nibbles which are different than initial nibbles being placed in the intermediate data stream and associated indicators being added to the bit map until, at block 110, counter Y1 is incremented to 97. At that point, at block 112, when counter Y1 is compared to limit Y2, counter Y1 is equal to limit Y2 and control passes to block 118.

At block 118 the bit map is compressed using a run length encoding scheme like the scheme described above and the intermediate data stream is also compressed as indicated above. Then, at block 120 processor 32 forms a header nibble or leading word and segment size indicator as indicated above. The compressed data, leading word and segment size indicators are limited together as indicated in FIG. 9. Thus, a complete compressed data stream CDS according to the preferred embodiment includes a leading word, the compressed intermediate data stream IDS and the compressed bit map.

After the CDS is provided at block 120, at block 122 processor 32 transmits the CDS to secondary memory 43 for storage and further subsequent processing by array processor 45.

Also, preferably, each massive initial data stream is divided into smaller data streams referred to hereinafter as data stream segments prior to compression and each of the separate segments is compressed separately resulting in a separate compressed segment for each initial segment. For example, an initial stream may be essentially equally divided into ten smaller segments for compression and transfer to secondary memory 43 for storage. In this case, if desired, at a subsequent time one or a subset of the smaller compressed data segments can be accessed and further processed or, indeed, all of the smaller compressed segments can be accessed and combined to form an image.

It should be appreciated that the inventive compression scheme is relatively computationally simple and therefore requires relatively little computing time. In addition, because the inventive scheme appreciably reduces PET data, data transfer from processor 30 to secondary memory 43 can be accomplished quickly and the amount of secondary memory required to store a complete set of PET data is minimized. Furthermore, because PET data is reduced, the time required to retrieve the data from secondary memory is also reduced. Moreover, the time required to expand the compressed data is minimal as the reverse or decompression process is relatively simple as well.

It should also be appreciated that while the invention is described as one wherein two different run length encoding schemes are used, one for compressing the bit map and a second for compressing the intermediate data stream, clearly, other run length encoding schemes could be used.

Moreover, it should be appreciated that, while the invention as described above in the context of a PET system, clearly the invention could be used in the context of other imaging modalities to compress data for storage and to speed storing and retrieval times. Furthermore, while the steps of compressing the bit map and intermediate data stream are described as occurring after the main nibble comparison loop (i.e. see 104 through 112 in FIG. 10), the invention also contemplates a method wherein compression is performed within the main nibble comparison loop (i.e. just after block 116).

To apprise the public of the scope of this invention, I make the following claims:

What is claimed is:

1. A method to be used with a coincidence scanner including a plurality of detector elements arranged adjacent a scanner area wherein, the scanner detects subatomic particles, the scanner also including a separate N bit counter for each element, each counter incremented for each detected particle, the counter counts together forming an uncompressed data stream including M bit data nibbles, each M bit data nibble, prior to acquisition, having an initial value, the method for compressing the uncompressed data stream and comprising the steps of, after data collection:
   (a) selecting M bit nibbles from the initial data stream;
   (b) for each M bit nibble:
      (i) identifying an acquired nibble value;
      (ii) comparing the acquired value to the initial value;
      (iii) where the acquired and initial values are different,
         (1) storing the acquired-nibble in an intermediate data stream and (2) indicating storage in a bit map; and
      (iv) where the acquired and initial values are the same, indicating no storage in the bit map.

2. The method of claim 1 wherein each counter has a most significant M bit nibble and the step of selecting the M bit nibbles includes selecting each of the most significant M bit nibbles.

3. The method of claim 1 further including the step of attaching the bit map to the intermediate data stream to generate a compressed data stream.

4. The method of claim 3 also including the steps of generating a leading word which indicates the size of compressed data stream and the size of the intermediate data stream.

5. The method of claim 1 wherein each N bit counter includes a plurality of M bit nibbles, the method further including the steps of repeating steps (a) and (b) for each M bit nibble.

6. The method of claim 5 wherein N is 16 and M is 4.

7. The method of claim 5 further including the step of compressing the bit map using a run length encoding scheme.

8. The method of claim 7 wherein, the step of compressing includes applying the encoding scheme first to the most significant bits of the bit map corresponding to each counter followed by the second most significant bits of the bit map corresponding to each counter and so on through the least significant bits of the bit map corresponding to each counter.

9. The method of claim 1 also including the steps of, prior to identifying, dividing the data stream into stream segments and performing steps (a) and (b) for nibbles in each of the stream segments thereby generating a separate intermediate segment for each initial stream segment.

10. The method of claim 1 wherein the step of selecting includes first consecutively selecting the most significant nibbles of each counter followed by consecutively selecting the second most significant nibbles of each counter and so on through the least significant nibbles of each counter.

11. The method of claim 1 further including the step of compressing the intermediate data set using a run length encoding scheme.

12. The method of claim 1 wherein the imaging scanner is a PET scanner including an identifier wherein, when two elements detect subatomic particles within a temporal event window, the identifier identifies two elements as a coincidence pair and generates a coincidence data packet (CDP), the counters including a counter for each coincidence pair and incremented for each CDP corresponding to an associated coincidence pair.

13. An apparatus to be used with an imaging scanner including a plurality of detector elements arranged adjacent a scanner area wherein the scanner detects subatomic particles, the scanner also including a separate N bit counter for each element, each counter incremented for each detected particle, the counter counts together forming an uncompressed data stream including M bit data nibbles, each M bit data nibble, prior to acquisition, having an initial value, the apparatus for compressing the uncompressed data stream and comprising:
   an electronic processor running a programmable pulse sequencing program which, after data collection:
   (a) selects M bit nibbles from the initial data stream;
   (b) for each M bit nibble:
      (i) identifies an acquired nibble value;
      (ii) compares the acquired value to the initial value;
      (iii) where the acquired and initial values are different,
         (1) stores the acquired nibble in an intermediate data stream and (2) indicates storage in a bit map; and
      (iv) where the acquired and initial values are the same, indicates no storage in the bit map.

14. The apparatus of claim 13 wherein each counter has a most significant M bit nibble and the processor selects each of the most significant M bit nibbles.

15. The apparatus of claim 13 wherein the processor also attaches the bit map to the intermediate data stream to generate a compressed data stream.

16. The apparatus of claim 13 wherein each N bit counter includes a plurality of M bit nibbles and wherein the processor repeats steps (a) and (b) for each M bit nibble.

17. The apparatus of claim 16 wherein N is 16 and M is 4.

18. The apparatus of claim 13 wherein the processor also compresses the bit map using a run length encoding scheme.

19. The apparatus of claim 18 wherein the processor, during compression, applies the encoding scheme first to the most significant bits of the bit map corresponding to the counters followed by the second most significant bits of the bit map corresponding to the counters and so on through the least significant bits of the bit map corresponding to the counters.

20. The apparatus of claim 13 wherein the processor, prior to identifying, divides the data stream into stream segments and performs steps (a) and (b) for nibbles in each of the stream segments thereby generating a separate intermediate segment for each initial stream segment.

21. The apparatus of claim 20 wherein the processor also, for each segment, generates a header nibble which indicates the size of the initial segment, the number of nibbles in the initial which were not stored in the intermediate segment and the size of the compressed segment and attaches the header nibble to the compressed data segment.

22. The apparatus of claim 13 wherein the processor selects by first consecutively selecting the most significant nibbles of the counters followed by consecutively selecting the second most significant nibbles of the counters and so on through the least significant nibbles of the counters.

23. The apparatus of claim 13 wherein the processor compresses the intermediate data set using a run length encoding scheme.

24. The apparatus of claim 13 wherein the imaging scanner is a PET scanner including an identifier wherein, when two elements detect subatomic particles within a temporal event window, the identifier identifies the two elements as a coincidence pair and generates a coincidence data packet (CDP), the counters including a counter for each coincidence pair and incremented for each CDP corresponding to an associated coincidence pair.

* * * * *